United States Patent
Du Reau et al.

(10) Patent No.: US 6,717,996 B1
(45) Date of Patent: Apr. 6, 2004

(54) DIGITAL SIGNAL TIMING SYNCHRONIZATION PROCESS

(75) Inventors: Philippe Du Reau, Bagneux (FR); Daniel Duponteil, Vanves (FR); Julie Yuan-Wu, Versailles (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 09/533,924

(22) Filed: Mar. 23, 2000

(30) Foreign Application Priority Data

Mar. 26, 1999 (FR) .............................. 99 03820

(51) Int. Cl.[7] .............................................. H04L 27/06
(52) U.S. Cl. ...................... 375/343; 375/355; 375/365; 370/509
(58) Field of Search .................. 375/142, 143, 375/145, 148–150, 152, 260, 285, 326, 327, 340, 343, 349, 350, 355, 365; 455/10, 501, 502, 504, 506, 63, 65, 67.3, 135, 134, 143, 226.2, 226.3, 277.2, 296; 370/320, 332, 335, 342, 441, 503, 509, 516

(56) References Cited

U.S. PATENT DOCUMENTS

| | | | |
|---|---|---|---|
| 5,420,850 A | * | 5/1995 | Umeda et al. ............... 370/342 |
| 5,673,286 A | | 9/1997 | Lomp |
| 5,737,361 A | | 4/1998 | Park et al. |
| 5,778,022 A | | 7/1998 | Walley |
| 5,805,648 A | | 9/1998 | Sutton |
| 5,892,792 A | * | 4/1999 | Walley ........................ 375/152 |
| 6,301,287 B1 | * | 10/2001 | Walley et al. ............... 375/140 |

FOREIGN PATENT DOCUMENTS

| | | |
|---|---|---|
| DE | 3611959 | 10/1987 |
| EP | 0 776 106 | 5/1997 |

* cited by examiner

*Primary Examiner*—Khai Tran
*Assistant Examiner*—Khanh Cong Tran
(74) *Attorney, Agent, or Firm*—Oblon, Spivak, McClelland, Maier & Neustadt, P.C.

(57) ABSTRACT

Definition takes place of a sliding window of width Ne times the sampling period (Te); for each sliding window calculation takes place of the sum of the elementary powers of the correlation samples located in said window; determination takes place of the window for which the sum of the powers is at a maximum, the synchronization then being defined by the position of the synchronized window on the window having the maximum power sum and by the rank of each correlation sample within said window.

24 Claims, 8 Drawing Sheets

DIGITAL SIGNAL TIMING SYNCHRONIZATION PROCESS

TECHNICAL FIELD

The present invention relates to a digital signal timing synchronization process. It is used in radio transmission systems and more particularly in code distribution multiple access (CDMA) systems.

PRIOR ART

The principles of a digital communication and the link existing between baseband signals and carrier frequency signals are known and described e.g. in the work by John G. PROAKIS entitled "Digital Communications", McGraw Hill International Editions.

FIG. 1 is the circuit diagram of a radio digital transmission chain.

In the transmission chain E, an original digital signal 10A which it is wished to transmit undergoes a preprocessing in a circuit 10. This preprocessing can involve numerous scrambling, interleaving or coding operations, which will not be dealt with in the remainder of the description. The circuit 10 delivers a sequence 10B of digital signals a(k), in which k designates the rank of the symbol. The symbol a(k) is in general a complex number represented by a pair of real values. The frequency of the symbols a(k) is designated Hs and the corresponding period Ts, with Ts=1/Hs.

On the basis of the sequence a(k), a shaping device 20 develops the baseband analog signal 20A to be transmitted and designated b(t), in which t is the time variable. The signal b(t) is a complex signal represented by two real quadrature signals $b_I(t)$ and $b_Q(t)$. The baseband signal 20A is converted to a carrier frequency by a radio transmitter 30, which incorporates various means, namely a modulator, frequency conversions, filters, local oscillators, amplifiers and an antenna, but to which no further reference will be made hereinafter. It is merely assumed that the transmitter performs a linear, mathematical operation with respect to the baseband signal. The transmitted radio signal 30A is propagated to the receiver, whilst undergoing different types of degradations.

In the reception chain R, the radio signal received 40A is firstly processed by a radio receiver 40, which incorporates different devices, namely an antenna, frequency conversion means, filters, local oscillators and amplifiers, but to which no further reference will be made hereinafter. The receiver 40 delivers an analog baseband signal 40B, which is designated r(t). The signal r(t) is a complex signal represented by two real quadrature signals $r_I(t)$ and $r_Q(t)$. On the basis of the signal r(t) a detection device 50 develops a set of symbols or digital samples 50A. The set of detected samples 50A constitutes a more or less faithful image of the sequence of symbols a(k). The detected samples 50A undergo a postprocessing in a circuit 60. This postprocessing comprises various operations corresponding to the preprocessing operations 10 of the transmission chain E and delivers the restored signal 60A.

The development of the set of detected samples 50A assumes as precisely known the value of the period Ts of the timing of the sequence a(k) and its phase relative to the baseband signal r(t). A synchronization device 70, by means of the signals 50B which it exchanges with the detection device 50, estimates the timing of the signals received and communicates the result of this estimate to the detection device. Certain detection processes known as coherent demodulation also require the knowledge of the phase of the carrier frequency of the radio signals received. This knowledge is not envisaged here and demodulation can be both coherent and non-coherent. It is merely assumed that the beat frequency between the carrier frequency used in the receiver and the real carrier frequency is low compared with the timing Hs of the symbols a(k).

The functional partitioning which has been made is to a certain extent arbitrary and certain operations can overlap. However, it is assumed that there is effectively a received baseband signal 40B or an equivalent representation of this signal in the form of digital samples.

The present invention essentially relates to the synchronization operation carried out in the reception chain.

Synchronization is linked with the shaping of the baseband signal to be transmitted b(t) and to the corresponding detection conditions. It is here assumed that the shaping corresponds to the linear mathematical operation:

$$b(t) = \sum_k a(k) \cdot h(t - kTs)$$

in which $$\sum_k$$

represents a summation on all the symbols a(k) and in which h(t) designates a real or complex function of the time t.

An important case is that of the direct sequence spreading, where $$h(t) = \sum_{n=0}^{N-1} \alpha(n) \cdot g(t - nTc).$$

In this expression, $\alpha(n)$ is a family of previously defined, complex or real numbers independent of the value of the symbols a(k) which it is wished to transmit. The numbers $\alpha(n)$ are known as chips in terminology widely used in this field. With each rank k are associated N successive chips $\alpha(n)$ numbered n=0 to n=N−1. The chips are delivered with a period Tc=Ts/N and the corresponding timing is designated Hc. The number N of chips per symbol is called the spread factor. The function g(t) is a real or complex function independent of the rank k and the number n. It is called the "shaping function" of the chip. The direct sequence spread CDMA transmission systems allocate to each user a particular family of chips $\alpha(n)$, the different families of chips being chosen so as to reduce interference between users.

Although the invention does not apply directly to the actual detection, it is necessary to take account thereof. In the case of a transmission channel which does not deform the signal, but merely superimposes thereon an independent interference signal called Gaussian white noise, the optimum detection is obtained by the matched filtering method or an equivalent method. This method consists of applying the baseband signal received r(t) to a transfer function filter h*(−t) in order to obtain a signal s(t):

$$s(t) = h^*(-t) * r(t)$$

where * represents the complex conjugation operation when it is placed at the exponent, or the convolution operation when it is placed at midheight. Strictly speaking, matched filtering is carried out with the aid of a transfer function filter h*(Tr−t), where Tr is a fixed delay or lag chosen in such a way that the function h*(Tr−t) is causal with respect to the variable t. This delay corresponds to the time necessary to complete the calculation of s(t) on the basis of r(t) for a given time t, but plays no part in the following explanations. For reasons of simplicity, it is assumed to be zero hereinafter. The values of the signal s(t) at appropriately chosen times constitute the set of detected samples 50A or would make it possible to develop said set with the aid of supplementary operations.

In the case of direct sequence spreading, matched filtering is broken down into a filtering matched to the shape of the chip:

$$s_c(t)=g^*(-t)*r(t)$$

and a filtering matched to the chip sequence:

$$s(t) = \sum_{n=0}^{N-1} a*(n) \cdot s_c(t + nTc)$$

where the function $s_c(t)$ is used as a calculation intermediate. Filtering matched to the chip sequence is called despreading.

Numerous methods exist for the recovery of the timing or clock on the basis of the baseband output signal of the matched filter. Certain make use of a global approach where the carrier frequency phase, timing phase and symbols are jointly estimated. From the practical standpoint it is often simpler to separately estimate the phase of the timing or clock. In general terms, timing recovery requires a derivation with respect to the time of the baseband output signal of the matched filter, in order to reveal signal transitions. Among possible processes, certain bring together a differentiator and a phase locked loop, whereas others effect a non-linear operation followed by a filtering and a zero passage detector of the signal, whilst still others multiply the signal with itself in delayed form.

In reality, the radio signal is often propagated in a complex manner between the transmitter and the receiver following several different paths. This applies with respect to the earth radio mobile channel. The signal received is presented to the receiver at delayed times. Optimum detection must take account of the pulse response of the channel. From the mathematical standpoint, filtering matched to the pulse response of the channel implements a recombination of all the existing paths. This operation is partly performed in conventional rake receivers, which combine a limited number of paths. The number of elementary timing recovery devices is of the same level as the number of processed propagation paths.

The aim of the invention is to implement a common timing recovery process able to keep pace with a very large number of paths.

DESCRIPTION OF THE INVENTION

In the case of an ideal, noise-free transmission, the received baseband signal r(t) is linked with the baseband signal to be transmitted b(t) by an expression of form:

$$r(t)=A.\exp(j\phi).b(t-\tau)$$

where j designates the imaginary part of a complex number ($j^2=-1$) and exp is the exponential function, A and $\phi$ respectively represent the amplitude and phase of the gain of the transmission channel and $\tau$ is the propagation time. If the carrier frequency is not precisely known, the phase term $\phi$ evolves slowly during time. This term is cancelled out or compensated in the case of a coherent demodulation. The output signal s(t) of the matched filter is of form:

$$s(t) = A \cdot \exp(j\varphi) \cdot \sum_k a(k) \cdot Rh(t - \tau - kTs)$$

in which Rh(t) designates the time autocorrelation function of h(t). Generally the function h(t) is chosen in such a way that its autocorrelation Rh(t) verifies the so-called Nyquist condition:

$$Rh(nTs)=0$$

for any integer n differing from zero and assumes low values as soon as the variable t assumes values higher than a few symbol periods Ts. Under these conditions, the value of s(t) at the time $\tau+nTs$ is:

$$s(\tau+nTs)=A.\exp(j\phi).a(n).Rh(0)$$

and its value at a time $\theta+\tau+nTs$, where the quantity $\theta$ is small compared with Ts, is approximately:

$$s(\theta+\tau+nTs) \approx A.\exp(j\phi).a(n).Rh(\theta)$$

The square of the modulus of the quantity $s(\theta+\tau+nTs)$ is:

$$|s(\theta+\tau+nTs)|^2 \approx A^2.|a(n)|^2.|Rh(\theta)|^2$$

If there is interest in the case of a digital modulation by phase displacement, the value of $|a(n)|^2$ is then independent of the transmitted symbol and the quantity $|s(0+\tau+nTs)|^2$ is approximately proportional to $|Rh(0)|^2$. The autocorrelation function Rh(t) takes on its maximum value at t=0. If the function h(t) is carefully chosen, the autocorrelation function Rh(t) has a narrow main peak in the vicinity of t=0 and possibly very attenuated secondary maxima when the value of t increases. Thus, the observation of the position of the successive maxima of $|s(t)|^2$ makes it possible to locate the time $\tau+nTs$ and therefore recover the timing. Hereinafter, the quantity $|s(t)|^2$ will be called the power of the signal after matched filtering.

In the case of a multipath transmission there is no single propagation time and, on the evolution of the power $|s(t)|^2$ in time, there are packets of successive peaks in the vicinity of the mean position of each symbol a(k). Each correlation peak corresponds to a particular propagation path and each packet of peaks occupies a time interval corresponding to the difference between the longest propagation time and the shortest time. Such a time interval is called a "path window". The synchronization process proposed by the invention consists of placing a window on the packets of correlation peaks. The centre of the window then defines a mean propagation time $\tau$ and the position of the different paths is referenced with respect to said time.

The received baseband signal r(t) delivered by the radio receiver has undergone a low pass filtering. Therefore there is an upward limitation to its frequency spectrum. The same applies with respect to the shaping function h(t). Consequently the signal s(t) is also frequency-limited. From the mathematical standpoint, if Fmax designates the highest frequency contained in the spectra of functions r(t), h(t) and s(t), these functions are exactly represented by their samples r(mTe), h(mTe) and s(mTe) taken at times mTe regularly spaced by a quantity Te, known as the sampling period, provided that said quantity verifies the so-called Shannon condition:

$$Te < \frac{1}{2 \cdot F\max}$$

It is possible to choose here as the sampling period Te a submultiple of the symbol period Ts:

$$Te = \frac{Ts}{M}$$

in which M is an integer higher than 1 and compatible with the Shannon condition. It is not indispensable to choose Te as a submultiple of Ts, but it is indispensable that the choice of M is compatible with the Shannon condition. The samples of s(t) are expressed with the aid of samples of r(t) and h(t):

$$s(mTe) = Te \cdot \sum_i h*(iTe) \cdot r[(i+m) \cdot Te]$$

For ease working takes place with the quantity:

$$y(m) = s(mTe)/Te$$

because the factor Te plays no part. From the practical standpoint, the function h(t) assumes low values on the basis of a certain value of t and it is possible to limit the summation on i to an interval between two relative integers $i_1$ and $i_2$ a priori chosen in accordance with the decrease of h(t):

$$y(m) = \sum_{i=i_1}^{i_2} h*(iTe) \cdot r[(i+m) \cdot Te]$$

The successive samples $y(m_0)$, $y(m_0+1)$, ..., $y(m_0+Ne-1)$, where $m_0$ is a particular rank and Ne a given positive integer, are located in a window of initial time $m_0Te$ and width NeTe. The integer Ne is obviously chosen as a function of the dispersion of the paths. As a symbol period Ts contains M sampling periods Te, it is possible to represent the sampling rank m in the form:

$$m = M.p + q$$

in which p and q are relative integers. For a given integer $q_0$, when q assumes the values of $q_0$ to $q_0+Ne-1$ and p assumes all possible integral values, a window of width NeTe is obtained, which is reproduced with the period Ts.

The synchronization process according to the invention is based on the one hand on the calculation of the total power in the window:

$$\sum_{m=m_0}^{m_0+Ne-1} |y(m)|^2$$

and on the other on the distribution of powers $|y(m)|^2$ within the window.

Synchronization involves two modes, namely an acquisition mode and a tracking mode. In the acquisition mode, the M possible positions, for q=0 at M−1, of the periodic window [Mp+q;Mp+q+Ne−1] are successively examined and the total power P(p,q) in each window is calculated:

$$P(p, q) = \sum_{i=0}^{Ne-1} |y(Mp+q+i)|^2$$

This power is higher when there are paths in the window than when there are no paths. At the moment where the total power assumes its maximum value, the rank q has a certain value $q_0$ and the window is approximately set on the packet of paths.

There is then a passage to the tracking mode. With each rank i within the window is associated a significance c(i) as a function of its position with respect to the centre of the window. This significance is a monotonic function (in the broadest sense) of the rack i. The sum of the weighted powers:

$$\sum_{i=0}^{Ne-1} c(i) \cdot |y(Mp+q_0+i)|^2$$

indicates where the mean power of the packet of paths is located with respect to the centre of the window and can be used for correcting the sampling time, thereby locking the position of the window on the packet.

Specifically, the present invention consequently relates to a digital signal timing synchronization process, in which sampling takes place with a certain sampling period of an analog signal resulting from the transmission of a signal modulated with the aid of a shaping function, a matched filtering of the samples takes place, said filtering being matched to the shaping function used by the modulation and leading to correlation samples, said process being characterized in that:

the elementary power of each correlation sample is calculated, a sliding window of width Ne times the sampling period is defined, i.e. NeTe and commencing at a certain rank, for each sliding window a calculation takes place of the sum of the elementary powers of the correlation samples located in said window for one symbol and for a given number of symbols, the window for which the sum of the powers is at a maximum is determined, the synchronization is then defined by the position of the synchronized window on the window with the maximum power sum, and by the rank of each correlation sample within said window.

Preferably, two types of operation are performed and working occurs in two modes:

a) in a first type of operations, known as scanning operations, there is a successive examination of all the possible positions of the sliding window (so-called scanning cycle) and for each position a calculation takes place of the global power (Pa) of the correlation samples (y(m)) contained in the sliding window, there is an identification of the window for which the global power is highest since the start of the cycle and up to the present position and the value of said highest power (Pam) is stored, b) in a second type of operations, called tracking operations, account is taken only of the correlation samples (z(m)), whose rank is in a so-called tracking window, calculation taking place on the one hand of the global power (Pb) of said samples and on the other of a signal (d) making it possible to lock the centre of said window on the mean position of the elementary powers which it contains, c) in a first operating mode known as the acquisition mode,
   on the one hand on each occasion where in a sliding window appears a global power (Pa) higher than the last power (Pam) stored since the start of the scanning cycle and up to the present position, to the tracking window is allocated the present position of the sliding window and a verification process is initiated,
   on the other hand when the scanning cycle is ended, there is a passage into a tracking mode, d) in a second operating mode, known as the tracking mode,
   on the one hand the transfer mechanism of the position of the sliding window to the tracking window is inhibited,
   on the other hand when the permanent verification fails there is a return to the acquisition mode.

DETAILED DESCRIPTION OF EMBODIMENTS

Before describing certain special embodiments of the process, it is appropriate to define its different phases:

Scanning Operations

This is a matter of the displacement of the sliding window, power calculations in said window and the search for the position supplying the maximum power.

Tracking Operations

These involve power calculations in the tracking window (even if synchronization has not yet been obtained), the calculation of the deviation signal of the position of said window and the control of the sampling timing by said deviation signal.

Acquisition Mode

In this mode, during a scanning cycle, whenever a power in the sliding window exceeds the highest power recorded since the start of the cycle, the position of the sliding window is communicated to the tracking window. Synchronization is generally obtained before the end of the scanning cycle, but one is only sure to have passed through the maximum power position when the cycle is at an end. There is then a passage to the tracking mode.

Tracking Mode

In this mode the tracking window is considered to be synchronized. Thus, there is a prevention of any action of the scanning device on the position of the tracking window. It is the permanent verification procedure which makes it possible to detect a possible desynchronization and to decide on a return to the acquisition mode.

Verification

In the acquisition mode, the position transfer of the sliding window to the tracking window triggers a verification procedure, which is relaunched for each new transfer. It is not interrupted by the passage of the acquisition mode to the tracking mode.

Synchronization With Equipment Economies

In this case, use is made of a single matched filtering means which, in the acquisition mode, performs the scanning operations and then in the tracking mode performs the tracking operations. It is then necessary to await the end of the scanning cycle to transfer the position of the maximum power sliding window to the tracking window.

Figure 1:
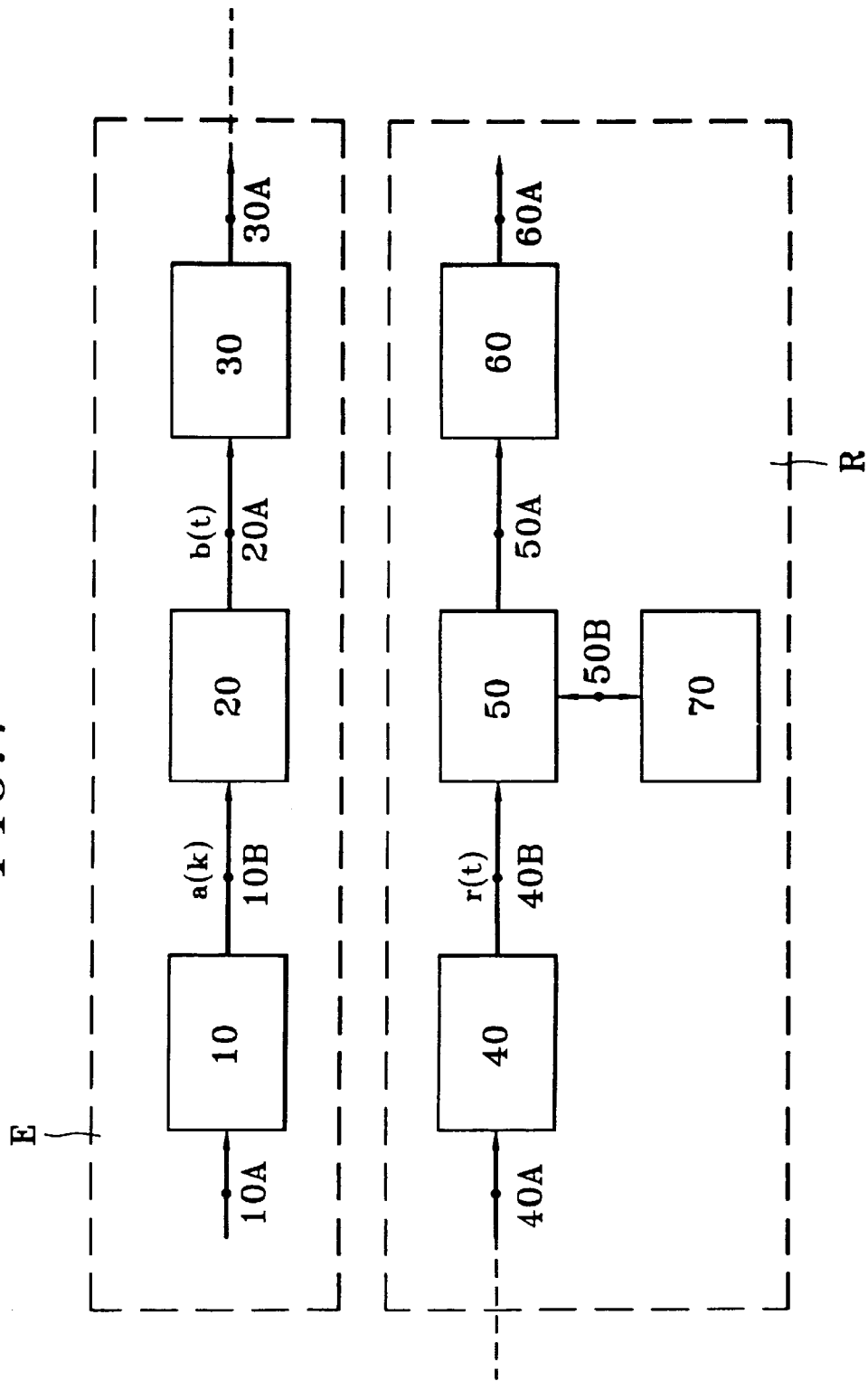
FIG. 1 already described, illustrates the principle of a digital transmission chain.
Figure 2:
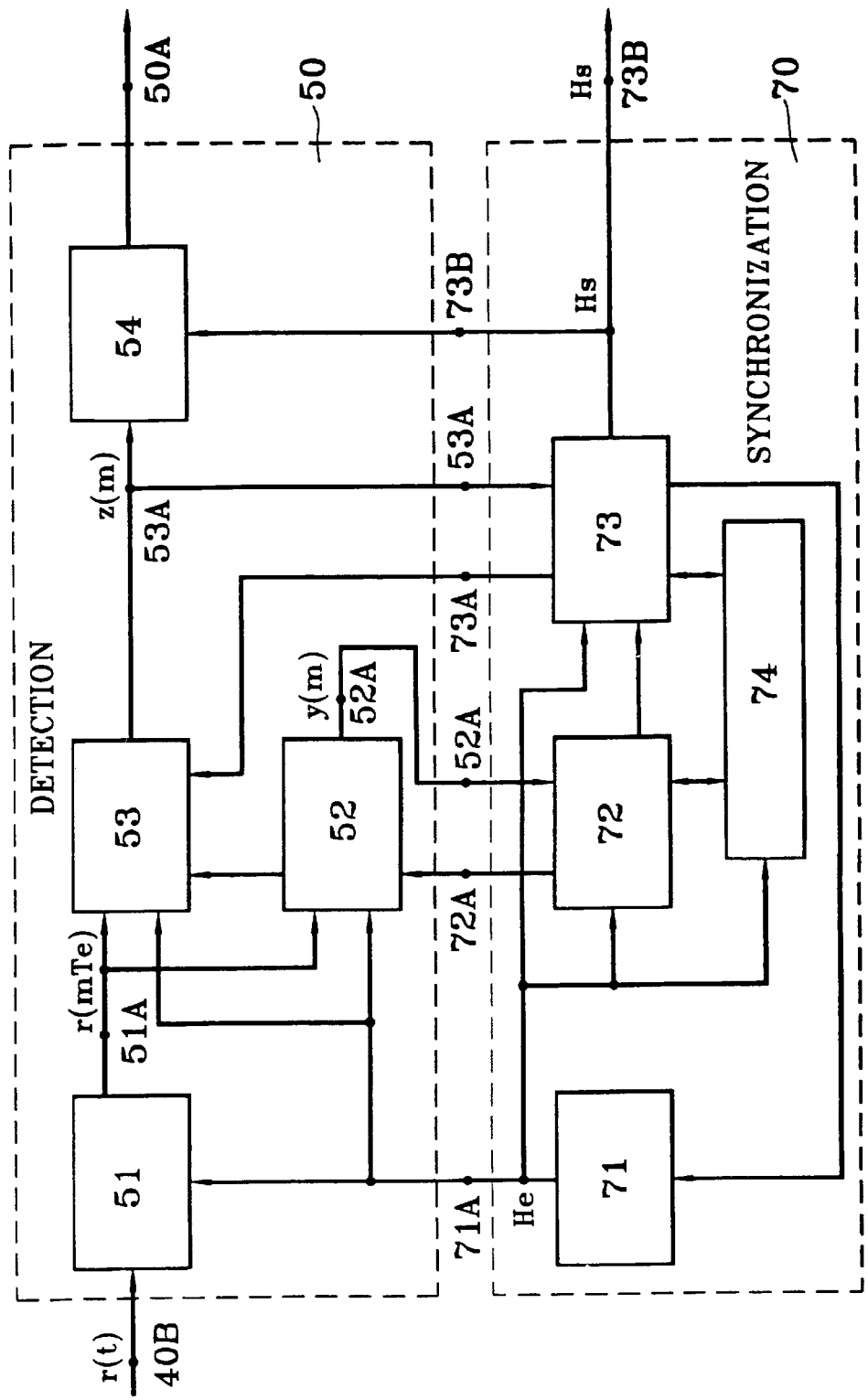
FIG. 2 is a diagram of the detection and synchronization implemented according to the invention.

FIG. 2 illustrates in general terms the detection and synchronization operations. This is a functional diagram whose partitioning does not necessarily correspond to a material partitioning and which are only shown those elements necessary for the understanding of the invention. The detection device 50 comprises a sampling device 51, two matched filtering means 52, 53, as well as a propagation path processing and demodulation means 54. The synchronization device 70 comprises a clock generator 71, a scanning device 72, a tracking device 73 and a sequencing system 74.

The clock generator 71 delivers a periodic or sampling signal 71A, designated He and of period Te. On the basis of the signal He and the baseband received signal r(t), the sampling device 51 develops the set 51A of samples r(mTe). The sampling carried out is asynchronous with respect to the symbol period Ts in the sense that the sampling phase is a priori of a random nature with respect to the start of a period and the equation Ts=M.Te is only strictly verified when synchronization has been acquired.

Under the control of the signals 72A supplied by the scanning device 72, the scanning matched filtering means 52 calculates the samples y(m) in accordance with the aforementioned relation:

$$y(m) = \sum_{i=i_1}^{i_2} h*(iTe) \cdot r[(i+m) \cdot Te]$$

This is a conventional, transverse digital filtering, which can be obtained by sliding correlation. The samples r(mTe) pass into a shift register at timing He and with each position i of the register is associated the fixed coefficient h*(iTe) used for the calculation of the product h*(iTe).r[(i+m).Te] and with each sampling period Te a new sample y(m) is delivered. Numerous variants are possible. For example, the set of coefficients h*(iTe) passes in front of the current sample r(mTe) or the samples y(m), y(m+M), y(m+2M), . . . corresponding to the successive symbols are calculated in parallel.

On the basis of the samples y(m), the scanning device 72 calculates the power contained in the window of width NeTe, i.e. from i=0 to i=Ne−1:

$$P(p, q) = \sum_{i=0}^{Ne-1} |y(Mp + q + i)|^2$$

The transmission channel is not perfect. It contains noise and the multiple propagation paths are not stable. It is consequently often necessary to take a mean of the power P(p,q) on several symbols, which amounts to calculating a power designated Pa(p,q):

$$Pa(p, q) = \sum_{w=0}^{Ns-1} P(p + w, q)$$

in which Ns is the number of symbols considered.

Under the control of the signals 73A supplied by the tracking device 73 and signals supplied by the scanning-matched filtering means 52, the tracking-matched filtering means 53 calculates a set of samples z(m) in accordance with the same relation as for the samples y(m):

$$z(m) = \sum_{i=i_1}^{i_2} h*(iTe).r[(i + m) \cdot Te]$$

The difference is that the samples y(m) are calculated for M possible relative positions of a sliding window, whereas the samples z(m) are only calculated for the Ne positions located within the synchronized window.

On the basis of the samples z(m), the tracking device 73 calculates the power Pu contained in the synchronized window and the power Pb summated on several symbols:

$$Pu(p, q) = \sum_{i=0}^{Ne-1} |z(Mp + q + i)|^2$$

$$Pb(p, q) = \sum_{w=0}^{Ns-1} Pu(p + w, q)$$

As these calculations are carried out on the basis of samples z(m) located in the synchronized window, the values obtained for Pu and Pb can differ by the values obtained for P and Pa.

Figure 3:
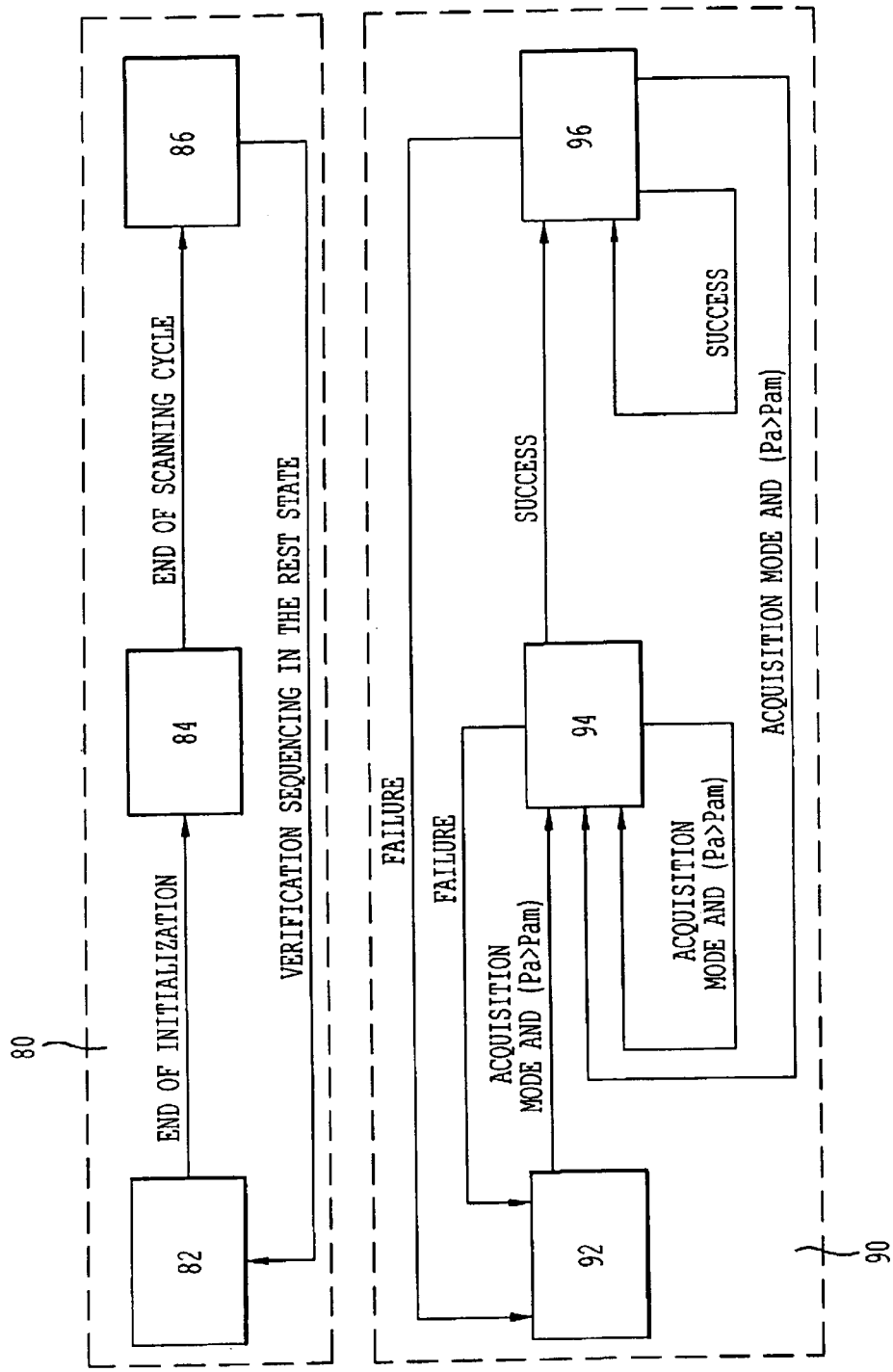
FIG. 3 is a functional diagram of the sequencing.

The sequencer 74 controls the synchronization stages of the tracking device 73 starting from the scanning device 72. FIG. 3 illustrates the synchronization procedure by means of two state diagrams: general sequencing 80 and verification sequencing 90. In these diagrams, the rectangles represent particular situations of the sequencing, the arrows indicate the evolution direction and the text appearing on the arrows indicates the evolution conditions.

The general sequencing block 80 comprises an initialization block 82, a block 84 corresponding to an acquisition mode and a block 86 corresponding to a tracking mode.

The verification sequencing block 90 comprises a rest state block 92, an initial verification block 94 and a permanent verification block 96.

Following an initialization phase (block 82) to permit the different circuits of the detection device 50 and synchronization device 70 to function correctly, the sequencer is placed in the acquisition mode (block 84) and performs a scanning cycle of M relative positions of the set of coefficients h*(iTe) and the set of samples r(mT$_e$). Whenever a new value of the power Pa is higher than the preceding values, said value is stored and the position of the sliding window is transferred to the window of the tracking device. Thus, at the end of the scanning cycle, the maximum value of the power Pa is stored and the tracking device is set on the maximum power window.

Bearing in mind the imperfections of the transmission channel, it is not impossible for the power Pa to momentarily assume an abnormally high value and for a false acquisition to be obtained. As soon as a position transfer has taken place from the scanning sliding window to the tracking window, the power Pb obtained in the tracking window is compared with the power Pa obtained in the scanning window. From the practical standpoint it is possible to adopt the following verification strategy in two stages known respectively as "initial verification" and "permanent verification", illustrated by block 90 in FIG. 3. The initial verification (block 94) determines whether the synchronization proposed by the scanning device is probable. The aim of the permanent verification is to detect a possible desynchronization. For the initial verification it is possible to define a relative power threshold λ, namely a real number between 0 and 1. On designating as Pam the power value Pa stored at the time of the particular transfer of the position of the window, the wish is to compare the power Pb obtained in tracking with the value λ.Pam. The initial verification consists of examining among Na successive values of the power Pb whether at least Nb among them exceed the quantity λ.Pam. The integers Na and Nb are chosen as a function of the transmission conditions and are relatively small so as to ensure that the verification time is short (e.g. Na=4 and Nb=2). If the examination is satisfactory, there is a passage to a permanent verification (block 96). The latter consists of comparing the power Pb with a quantity μ.Po, in which Po designates the mean expected power Pb in the synchronized state and μ designates a threshold close to 1, chosen more finely than the threshold λ. However, the comparison relates to a large number Nv of successive values of Pb in order to reduce the influence of fluctuations. It is e.g. possible to add the deviations Pb-μ.Po obtained on Nv consecutive tracking windows and consider the synchronization as satisfactory if the sum is positive and then recommence the operation with the Nv following values and so on. It should be noted that the initial verification and permanent verification can be carried out without interrupting the scanning procedure.

In the acquisition mode (block 84), the appearance of a higher power Pe than the last stored power Pam interrupts any verification procedure which may be taking place and initiates a new initial verification (block 94). At the end of the scanning cycle, the sequencer passes from the acquisition mode 84 to the tracking mode 86 and remains there for as long as there is no verification failure and has restored to the rest state the sequencing of the verification. The general sequencing 80 then resumes as from its initialization state.

When the sequencer is in the tracking mode 86, the scanning-matched filtering means 52 and the scanning device 72 become available. Optionally, the scanning device can continue to search to establish the scanning sliding window position delivering the maximum power. This position can then be saved at the end of each scanning cycle. In the case of a synchronization loss, said saved position can be used for initiating a rapid reacquisition.

In view of the fact that the scanning and tracking-matched filtering means perform the same type of calculations, it is possible to only use a single matched filtering means firstly functioning in scanning and then in tracking. Compared with the preceding sequencing, it is merely necessary to await the end of the scanning cycle in order to carry out the verification and the mean acquisition time is longer. However, the volume of calculations carried out in the scanning filtering means is often an order of magnitude higher than the corresponding volume of calculations of the tracking filtering means, so that the elimination of a filtering means does not lead to a significant material economy.

The synchronization obtained according to the sequencing described hereinbefore, is maintained by locking the sampling timing generator 71 (FIG. 2) on the position deviation of the tracking window with respect to the position considered ideal. The deviation signal d is obtained from sample z(m) at the output of the tracking filtering means 53 as a sum of weighted powers in the window, in accordance with what was stated hereinbefore:

$$d = \sum_{i=0}^{Ne-1} c(i) \cdot |z(Mp + q_0 + i)|^2$$

in which $q_0$ is the rank transmitted to the tracking filtering means 53 during acquisition.

Different choices are possible for the significances or weights c(i). It is e.g. possible to take c(i)=1 in the upper half of the window and c(i)=−1 in the lower half, which amounts to taking as the signal d the difference of the powers in each half-window. It is also possible to choose as the ideal window position the barycentre of powers, i.e. choosing significances c(i) of form:

$$c(i) = i - \frac{Ne-1}{2}$$

in which $$\frac{Ne-1}{2}$$

characterizes the centre of the window. The latter choice will in general lead to a more stable synchronization than the former. Intermediate choices where the significance c(i) increases in absolute values when the rank i moves away from the centre of the window are obviously possible.

The timing or clock generator 71 can e.g. be locked or controlled with the aid of a second order phase locked loop using the signal d as the error signal.

On the basis of the set of samples z(m) of the tracking-matched filtering and information 73B of the symbol timing Hs delivered by the tracking device (e.g. in the form of the first sampling rank of the tracking window) the path processing and demodulation means 54 develops the sequence of detected samples or symbols 50A. In general, said means 54 will carry out an elementary demodulation on each path of the window and will recombine the results.

For ease, in everything hereinbefore, the synchronization has been described in the case where the shaping function h(t) is not dependent on the rank k of the symbol. In certain important cases, the shaping is dependent on the symbol rank k but not on the actual symbol a(k). If the successive shaping functions are appropriately chosen, this can lead to certain advantages, namely the possibility of coping with multiple propagation paths dispersed over a time exceeding the symbol period, as well as a reduction or rendering uniform of scrambling effects.

What is envisaged here is the case of a sequence of K successive shaping functions h(k,t) for k=0 to K−1, which are repeated periodically every K symbols. The synchronization then consists not only of locating the samples in a symbol period, but also the received symbols with respect to the sequence of functions h(k,t). The output signal s(t) of the matched filter must then be replaced by K signals s(k,t). The scanning-matched filtering means delivers K sets of samples y(k,m) for k=0 to K−1:

$$y(k,m) = \sum_{i=i_1}^{i_2} h*(k, iTe) \cdot r[(i+m) \cdot Te]$$

The shaping functions h(k,t) are assumed to be appropriately chosen so that their intercorrelation functions assume low values. For a given value of k, the products $h*(k,iTe) \cdot r[(i+m).Te]$ having a major contribution to the calculation of y(k,m) are then those corresponding to the passage of the symbols of rank k+wK, in which w designates a random relative integer. The power of the samples y(k,m) in a sliding window is still usable for seeking the synchronization.

As soon as the number K exceeds a few units, it becomes difficult to use K matched filters operating simultaneously and then the following strategy can be adopted. It is assumed that the scanning-matched filter comprises a shift register of length $i_2-i_1-1$, in which transit the samples r(mTe), and a register of length $i_2-i_1+1$ containing the coefficients $h*(k, iTe)$. At time $(i_2+m_0).Te$, where $m_0$ is a particular integer, the shift register contains the samples $r[(i_1+m_0).Te]$, $r[(i_1+m_0+1).Te]$, ..., $r[(i_2+m_0).Te]$ and the coefficient register is loaded with the values $h*(k_0,iTe)$ for a particular integer $k_0$. During a symbol period, the matched filter delivers the successive samples $y(k_0,m_0)$, $y(k_0,m_0+1)$, ..., $y(k_0,m_0+w)$, ..., $y(k_0,m_0+M-1)$. The coefficient register is then loaded with the coefficients $h(k_0+1,iTe)$. The matched filter delivers the samples $y(k_0+1,m_0+M)$, ..., $y(k_0+1,m_0+M+w)$, ..., $y(k_0+1,m_0+2M-1)$. The operation is then continued with the coefficients $h*(k_0+2,iTe)$ and so on up to the set of coefficients $h*(k_0+Ns-1,iTe)$ for which the matched filter supplies the samples $y(k_0+Ns-1,m_0+Ns.M-Ns)$, ..., $y(k_0+Ns-1,m_0+Ns.M-Ns+w)$, ..., $y(k_0+Ns-1,m_0+Ns.M-1)$. Thus, the examination has related to Ns consecutive symbols. The Ns samples $y(k_0,m_0)$, $y(k_0+1,m_0+M)$, ..., $y(k_0+Ns-1,m_0+Ns.M-Ns)$ correspond to a given relative position of the sequence r(mTe) with respect to the shaping functions. Thus, $p_0$ designates this position. The Ns samples $y(k_0,m_0+w)$, $y(k_0+1,m_0+M+w)$, ..., $y(k_0+Ns-1,m_0+Ns.M-Ns+w)$ correspond to a relative position, shifted by w sampling periods relative to the preceding relative position. This position is designated $p_0+w$. The power corresponding to this position is:

$$\sum_{i=0}^{Ns-1} |y(k_0+i, m_0+iM+w)|^2$$

Thus, powers are obtained which correspond to the M positions $p_0$, $p_0+1$, ..., $p_0+M-1$ and in order to obtain the M following positions it is necessary to continue the coefficient register loading operation not with the coefficients $h*(K_0+Ns,iTe)$, because once again the positions $p_0$ to $p_0+M-1$ would be obtained, but with the coefficients $h*(k_0+Ns-1,iTe)$, i.e. the set of coefficients used for the examination of the preceding symbol.

In what has stated hereinbefore, it is obvious on the one hand that the rank k appearing in h(k,t) and y(k,m) must be evaluated modulo K and on the other that the elementary powers $|y(k,m)|^2$ must undergo appropriate storage operations in order to be used at the appropriate time in the calculations.

The examination of K.M relative possible positions, as described hereinbefore, can take a relatively long time. To reduce this time it is possible to use Ns filters combined in the following way. On numbering these filters 0 to Ns−1, the input position of the shift register of the filter Ns−1 is connected to the current sample r(mTe) and the Mth position of the shift register of each filter (with the exception of filter 0) is connected to the input position of the shift register of the preceding filter. The coefficient register of the filter 0 is loaded with the coefficients h*($k_0$,iTe), in which $k_0$ is arbitrary (e.g. $k_0$=0) and each filter is loaded with the coefficients h*($k_0$+w,iTe) corresponding to its number w. For each sampling period, the Ns outputs of these filters deliver Ns samples corresponding to the same relative position of the sequence received r(mTe) and the sequence of shaping functions. At the end of K.M sampling periods, all the relative positions have been examined without it being necessary to change coefficients.

The tracking-matched filter can also comprise a shift register in which transit the samples r(mTe) and a register containing the coefficients h*(k,iTe). When the scanning device transfers the position of the window to the tracking device, it communicates to it the rank k of the shaping function with which the tracking-matched filter must start to work. The coefficient register of the tracking-matched filter is loaded with the corresponding coefficients h*(k,iTe). Then, for each symbol period, the content of the coefficient register is replenished with the sequence of coefficients h*(k,iTe), whose rank k is incremented by one unit (modulo K). Unlike the scanning-matched filtering means, the complexity of the tracking-matched filtering means is not affected by the number K. Its complexity is only dependent on the tracking window width Ne.Te. If the number of samples Ne in the window is at least twice smaller than the number of samples M in a symbol period, it is possible to reduce the length of the shift register of the tracking-matched filter and calculate the samples z(k,m) in several stages. However, if the number Ne exceeds M, it is necessary to use several filters for simultaneously obtaining samples corresponding to different symbols.

The invention described hereinbefore more particularly applies to direct sequence spread communications. In this case, the shaping functions h(k,t) are of the form:

$$h(k, t) = \sum_{n=0}^{N-1} \alpha(k, n) \cdot g(t - nTc)$$

This expression generalizes the expression of h(t) given hereinbefore. The family of chips $\alpha$(k,n) comprises K successive sequences (k=0 to K−1) of N chips $\alpha$(k,n). It often results from the combination of a spread sequence of N chips and a scrambling sequence of K.N chips. The manner of producing such a scrambled, spread sequence is not envisaged here and plays no part in the present invention. It is merely assumed that the family of K.N chips has appropriate autocorrelation properties. The shaping function g(t) of the chip is assumed to be common to all the chips.

As indicated hereinbefore, matched filtering is subdivided into filtering matched to the shape of the chip and a despreading by the chip sequence. Filtering matched to the shape of the chip is common to scanning filtering and tracking filtering. It delivers at times mTe samples x(m):

$$x(m) = \sum_i g*(iTe) \cdot r[(i+m) \cdot Te]$$

Therefore the set of samples x(m) is obtained by a conventional digital filtering at the sampling timing He. In order to appropriately carry out the despreading by the chip sequence, it is necessary to take the sampling period as a submultiple of the chip period:

$$Te = \frac{Tc}{Nc}$$

in which Nc is an integer higher than 1. The number of samples M per symbol is then: M=N.Nc.

On the basis of the set of samples x(m), despreading delivers the sequences of samples y(k,m):

$$y(k, m) = \sum_{n=0}^{N-1} \alpha*(k, n) \cdot x(m + nNc)$$

This expression is similar to that giving y(k,m) on the basis of the coefficients h*(iTe) and the samples r(mTe), but it leads to a simpler material implementation than that of the general case. As in the general case, the samples y(k,m) can be obtained by sliding correlation: the samples x(m) transit in a shift register at timing He and with each position nNc, which is a multiple of Nc, of the register is associated the chip $\alpha$*(k,n) used in the calculation of the product $\alpha$*(k,n).x(m+nNc) and with each period Te a new sample y(k,m) is delivered. It should be noted that the length of the shift register is M=N.Nc, whilst the number of products is only N. The chips $\alpha$*(k,n) must be replenished under the same conditions as the coefficients h*(k,iTe) of the general case. The possible variants and the power calculations are similar to those of the general case.

On the basis of the same set of samples x(m) from the filtering matched to the shape of the chip, the tracking despreading delivers the set of samples:

$$z(k, m) = \sum_{n=0}^{N-1} \alpha*(k, n) \cdot x(m + nNc)$$

the rank k evolving in accordance with the information supplied by the tracking device during the acquisition phase. As in the general case, the complexity of the tracking despreading is only dependent on the window width Ne.

Figure 4:
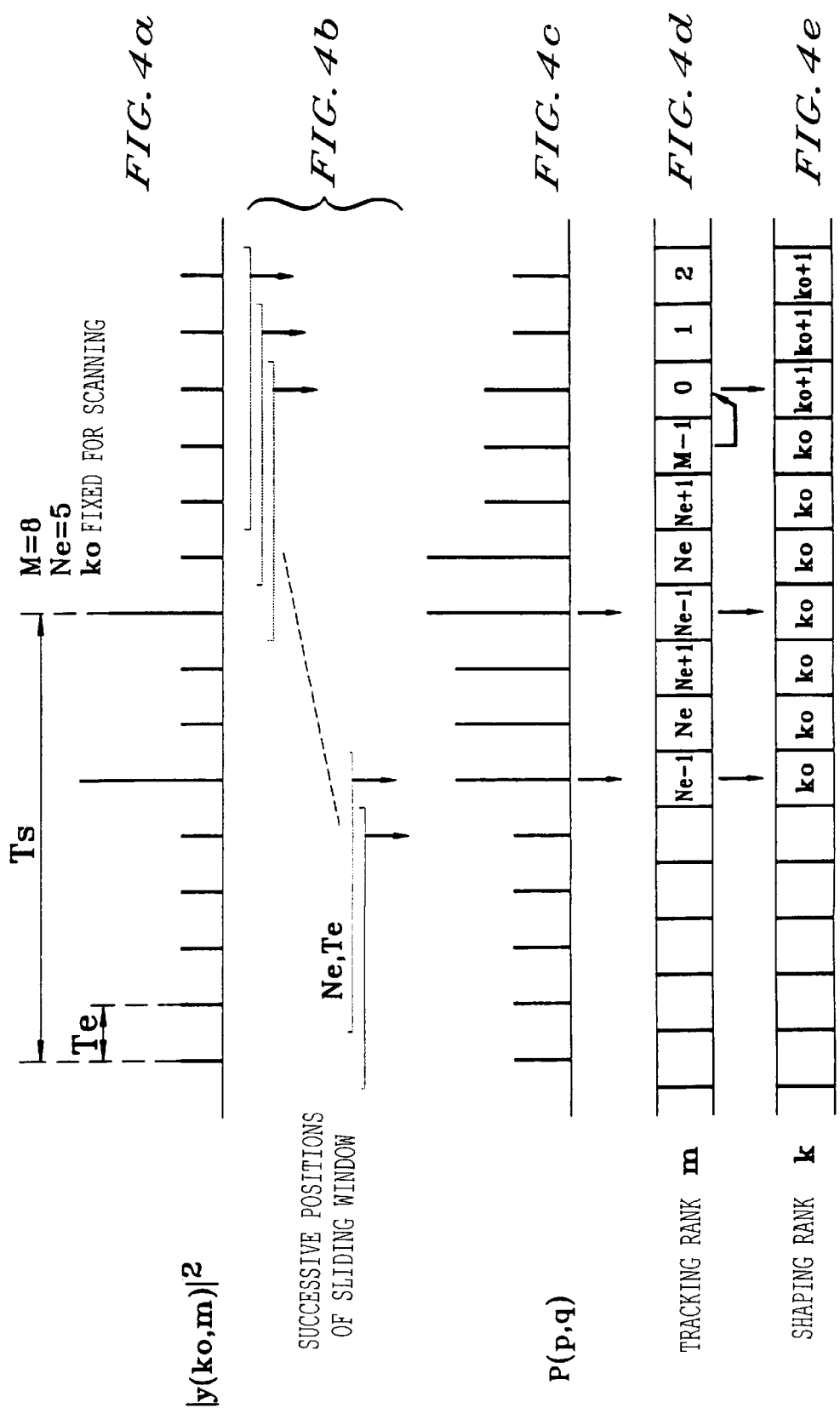
FIG. 4 shows various timing charts illustrating the sampling, the sliding windows, the powers in the windows and the tracking and shaping ranks.
Figure 5:
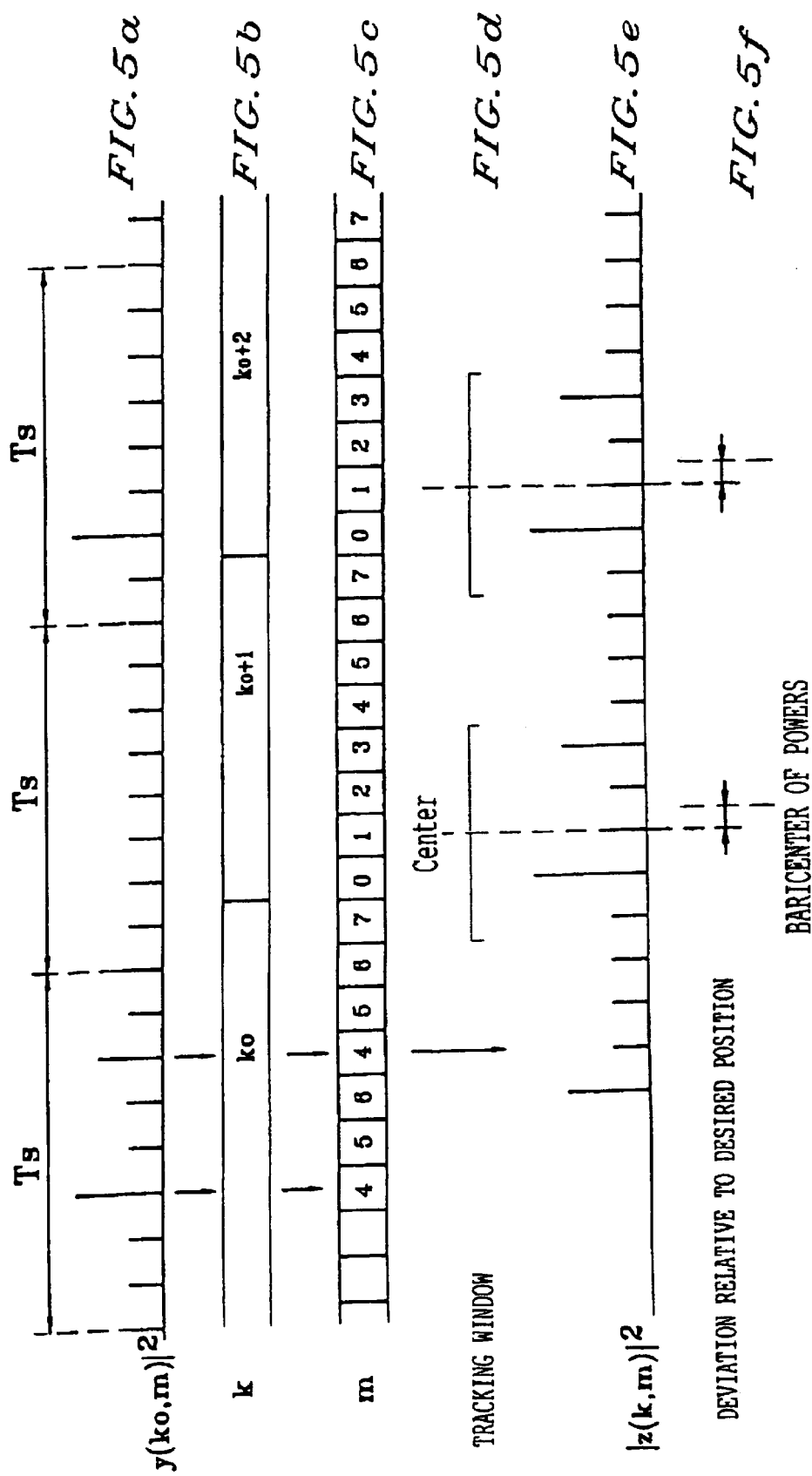
FIG. 5 illustrates the distribution of the powers in scanning and tracking.

FIGS. 4 and 5 illustrate the process according to the invention in simplified situations. They correspond to the case of a transmission with a shaping function h(k,t) dependent on the rank k of the symbol, as explained hereinbefore. For reasons of simplicity, it is assumed that there are only two propagation paths and that the power calculations relate to a single symbol (the powers P(p,q) and Pa(p,q) are consequently identical). For this example it is assumed that there is an operation with eight samples per symbol (M=8) and a window with a width of 5 samples (Ne=5).

In FIG. 4, line (a) represents the powers of the samples and line (b) the successive positions of the sliding window of width NeTe, line (c) the power P(p,q) in each window, line (d) the tracking rank m and line (e) the shaping rank.

FIG. 4 shows how information passes from the scanning sliding window to the tracking window. The scanning despreading correlator uses the reference chip sequence corresponding to an arbitrarily chosen rank $k_0$, but which is fixed throughout the transmission. The sequence of samples r(mTe) passes into the correlator and all possible relative positions of the reference sequence and the sequence received are consequently successively examined and on the evolution of the elementary power |y($k_0$,m)|² are observed two peaks corresponding to the coincidence with the propagation paths. The power P(p,q) obtained by summation of the powers |y($k_0$,m)|² is constant and low outside the zone of the propagation paths. Its value increases when account is taken of the first path, then passes through a level zone and then once again increases when taking account of the second path. It subsequently decreases in a level zone when the sliding window abandons the first path and then the second. Whenever the power P(p,q) increases, a symbol rank k and a sample rank m are transmitted to the tracking device (arrows directed downwards between lines (c) and (d)). Rank k is nothing more than $k_0$, because it is the rank of the reference sequence used in scanning for which the power increase has occurred. As the samples are numbered m=0 to m=Ne−1 in the tracking window, the transmitted rank m is equal to Ne−1, because it can only be assumed at a first approximation that the window closes just after the power has passed through a maximum. Taking account of the first power peak triggers a synchronization, which is not satisfactory. The passage of the second peak produces the definitive synchronization. Outside the transfers, the tracking rank m is incremented by 1, modulo M (line (d)) and rank k is incremented whenever the rank m passes through the value 0 (line (e)).

In FIG. 5 line (a) represents the power of the samples in scanning, line (b) the rank k, line (c) the rank m, line (d) the position of the tracking window, line (e) the power of the samples in tracking and line (f) the deviation with respect to the desired position.

Following the appearance of two peaks corresponding to the propagation paths (line (a)), the power $|y(k_0,m)|^2$ no longer has significant peaks in the following symbol periods until the shaping function used on transmission is again that corresponding to rank $k_0$. The power $|z(k_0,m)|^2$ (line (e)) is obtained on the basis of a reference sequence, whose rank k evolves at each symbol period in the same manner as the transmission rank. Thus, there are two correlation peaks for each symbol period. On the basis of the power distribution $|z(k_0,m)|^2$ in the window, the tracking device calculates an ideal position, e.g. the barycentre of powers. The deviation between this position and the centre of the window is used for controlling the clock generator. Thus, the deviation shown in FIG. 5 (line (f)) slows down the clock generator so that the centre of the window is displaced towards the barycentre of powers.

It should be observed that in most cases the samples are complex magnitudes with a real part and an imaginary part. Thus, the set of samples r(mTe) is constituted by two real sets $r_I$(mTe) and $r_Q$(mTe):r(mTe)=$r_I$(mTe)+j.$r_Q$mTe). The family of coefficients h*(iTe) is formed from two real families $h_I$(iTe) and $h_Q$(iTe):h*(iTe)=$h_I$(iTe)−j.$h_Q$(iTe). The real part $y_I$(m) and imaginary part $y_Q$(m) of the sample y(m) are then given by the expressions:

$$y_I(m) = \sum_{i=i_1}^{i_2} \{h_I(iTe) \cdot r_I[(i+m) \cdot Te] + h_Q(iTe) \cdot r_Q[(i+m) \cdot Te]\}$$

$$y_Q(m) = \sum_{i=i_1}^{i_2} \{h_I(iTe) \cdot r_Q[(i+m) \cdot Te] + h_Q(iTe) \cdot r_I[(i+m) \cdot Te]\}$$

in which the calculations relate to real numbers. In the same way, the power of the sample y(m) is given by the sum of the powers of the real and imaginary parts:

$$[y(m)]^2 = [y_I(m)]^2 + [y_Q(m)]^2$$

The development of the expressions involving the real part $\alpha_I$(n) and imaginary part $\alpha_Q$(n) of the chip $\alpha$(n), or the real part $z_I$(m) and imaginary part $z_Q$(m) of the sample z(m) is similar and immediate. In certain special cases, one or other of these elements can be reduced to a set of real values, the calculations then being simplified.

The implementation of the matched filtering operations has been presented in the form of shift registers in which transit the samples and coefficient or chip registers. Other equivalent methods are possible. It is in particular possible to use generators of coefficients h*(iTe) or chips $\alpha$(n), which deliver the coefficient or chip corresponding to the current sample r(mTe) or x(m) and obtain the sample y(m) or z(m) by accumulation of products of the type h*(iTe).r[(i+m).Te] or $\alpha$*(n).x(m+nNc).

For illustrating the preceding description, it is possible to describe the case of a CDMA transmission with direct sequence spread and modulation by phase displacement with 2 states (MDP2). The symbols a(k) are binary symbols assuming the values +1 and −1. The bits are often designated 0 and 1, but here the values +1 and −1 are involved, being respectively associated with these bits 0 and 1 with a view to modulation. Each symbol a(k) is spread by a sequence of N chips $\alpha$(k,n), for n=0 to N−1, dependent on the rank k, but independent of the value of the symbol a(k). Each chip $\alpha$(k,n) assumes one of the values +1 or −1. The family of chips $\alpha$(k,n) comprises K successive sequences of N chips, numbered k=0 to k=K−1. It is consequently reused for all the K symbols. The chip shaping function g(t) is a function assuming real values. It is chosen in such a way that the maximum frequency contained in its spectrum is lower than the chip timing or clock Hc, which is usually the case. It is e.g. sufficient to take a function respecting the Nyquist condition with respect to the chip timing and whose spectrum has the standard configuration of a "raised cosine" of rounding off factor below 1. Taking account of this property, the baseband signal received r(t) can be sampled at the timing 2.Hc, i.e. at a rate of 2 samples per chip without information loss (provided that the analog filtering preceding sampling eliminates frequencies higher than Hc).

On the basis of the set of baseband samples r(mTe), the filtering matched to the shape of the chip develops a set of samples x(m), whose real part $x_I$(m) and imaginary part $x_Q$(m) are given by the simple expressions relating to the real numbers:

$$x_I(m) = \sum_i g(iTe) \cdot r_I[(i+m) \cdot Te]$$

$$x_Q(m) = \sum_i g(iTe) \cdot r_Q[(i+m) \cdot Te]$$

The real part $y_I$(k,m) and imaginary part $y_Q$(k,m) of the sequence y(k,m) delivered by the despreading device are given by the following expressions relating to the real numbers:

$$y_I(k,m) = \sum_{n=0}^{N-1} \alpha(k,n) \cdot x_I(m+2n)$$

$$y_Q(k,m) = \sum_{n=0}^{N-1} \alpha(k,n) \cdot x_Q(m+2n)$$

Thus, for a given sampling rank m, the calculation of $y_I$ and $y_Q$ only uses one out of every two samples of the set x(m). Similar conclusions can be drawn for the set of samples z(m).

Figure 8:
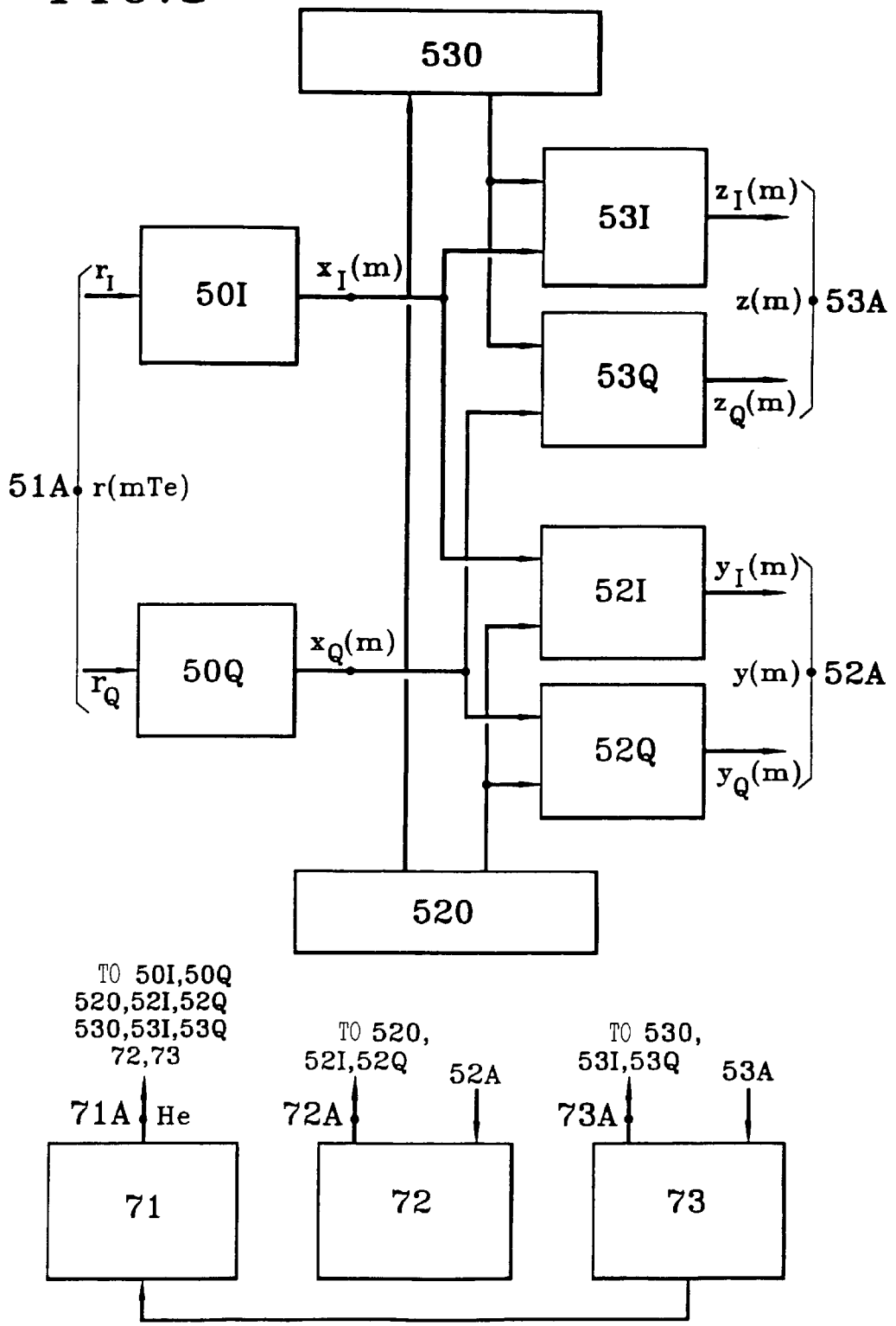
FIG. 8 shows the matched filtering and synchronization operation in the particular case of a CDMA-MDP2 transmission.

From this is deduced the matched filter and synchronization diagram of FIG. 8. The sampled signal received 51A is broken down into two real sample sets $r_I$(mTe) and $r_Q$(mTe) respectively applied to two separate filters 50I and 50Q of the same transfer function g(−t) effecting chip-matched filtering. These filters constitute a common part of the scanning-matched filtering 52 and tracking-matched filtering 53. The sample sets $x_I(m)$ and $x_Q(m)$ from these filters are simultaneously applied to the scanning and tracking despreading devices. The scanning despreading device comprises a chip generator 520 and two despreading circuits 52I and 52Q respectively operating on the sample sets $x_I(m)$ and $x_Q(m)$ for delivering the sample sets $y_I(m)$ and $y_Q(m)$. In the same way, tracking despreading comprises a chip generator 530 and two despreading circuits 53I and 53Q operating on the sets $x_I(m)$ and $x_Q(m)$ for delivering the sample sets $z_I(m)$ and $z_Q(m)$. The scanning device 72 functions in accordance with the general information given hereinbefore and calculates the elementary powers $[y_I(m)]^2 + [y_Q(m)]^2$ and then the power in a sliding window and seeks the relative position of the sequence of chips with respect to the samples received leading to the maximum power in the window. In the same way, the tracking device 73 operates in accordance with the general case and calculates the elementary powers $[z_I(m)]^2 + [z_Q(m)]^2$, the power in the tracking window, as well as the control signal d of the clock generator 71, followed by the performance of the prescribed verifications and the delivery of the regenerated symbol clock or timing Hs.

The filter matched to the shape of the chip (50I or 50Q) is a conventional digital filter. It can e.g. be implemented by means of a shift register in which transit at the timing He the samples $r_I(mTe)$ or $r_Q(mTe)$. With each register position is associated the coefficient g(iTe) by which the current sample of this position is multiplied. The sum of the products obtained constitutes the current sample $x_I(m)$ or $x_Q(m)$ at a given time.

The chip generator (520 or 530) e.g. consists of a table in which are placed the successive chips and a counter register containing the current rank of the chip to be used. This counter is incremented by one unit every two sampling periods and the corresponding chip is delivered to the despreading circuits. If the law for forming the sequence of K.N chips is sufficiently simple, e.g. if the chip sequence can be deduced from a random portion of given length of the sequence, other chip generation processes are possible. In general terms, the transfer of the position of the scanning sliding window to the tracking window consists of transmitting the rank of the counter of the scanning chip generator 520 or a portion of the corresponding chip sequence, at the time where the power obtained in the sliding window passes through a maximum.

The scanning despreading circuit (52I or 52Q) is e.g. formed by a sample register, a chip register, a chip transit register and summation devices. The sample register is a shift register in which transit at the timing He the samples $x_I(m)$ or $x_Q(m)$. The chip transit register is a shift register in which transit at the chip timing (i.e. here half the sampling timing He), the chips from the generator 520. Every 2N sampling periods (or every 2N.Ns periods, on simultaneously processing Ns symbols in a sample register containing 2N.Ns samples), the content of the chip transit register is transferred into the chip register. The chip register content remains immutable between two transfers. Every other position of the sample register (it is possible to choose both even rank positions and odd rank positions) is associated with a particular position of the chip register. As a function of the value +1 or −1 of the chips, the summation device corresponding to a symbol samples for each chip the current associated sample or its opposite and forms the sum of the sampled values, the result constituting a sample $y_I(m)$ or $y_Q(m)$. In accordance with what was stated hereinbefore, the chip generator 520 must be appropriately reinitialized whenever 2N.Ns relative positions have been examined.

The scanning despreading circuit (52I or 52Q) can also be implemented with the aid of a shift register in which transit at the chip timing the chips from the generator 520. With each position of said register are associated two accumulator devices. At the chip timing, one accumulation device performs the summation during a symbol period of the current sample $x_I(m)$ or $x_Q(m)$ of even rank or the value opposite to said sample depending on whether the chip equals +1 or −1. The second device performs the same operation on odd rank samples. Thus, if the shift register has N positions, 2N samples are successively obtained, corresponding to 2N consecutive relative positions. If the shift register has N.Ns positions, Ns samples are simultaneously obtained, corresponding to relative positions spaced by 2N and, at the end of 2N sampling periods, 2N.Ns consecutive relative positions have been examined. Numerous variants are possible.

The tracking despreading circuit (53I or 53Q) can be implemented in a similar manner to the scanning despreading circuit, but it has a very reduced extension. For example, if the second implementation process described hereinbefore for the scanning spreading is chosen, only Ne accumulation devices are required, in which Ne represents the number of samples contained in the window.

Figure 6:
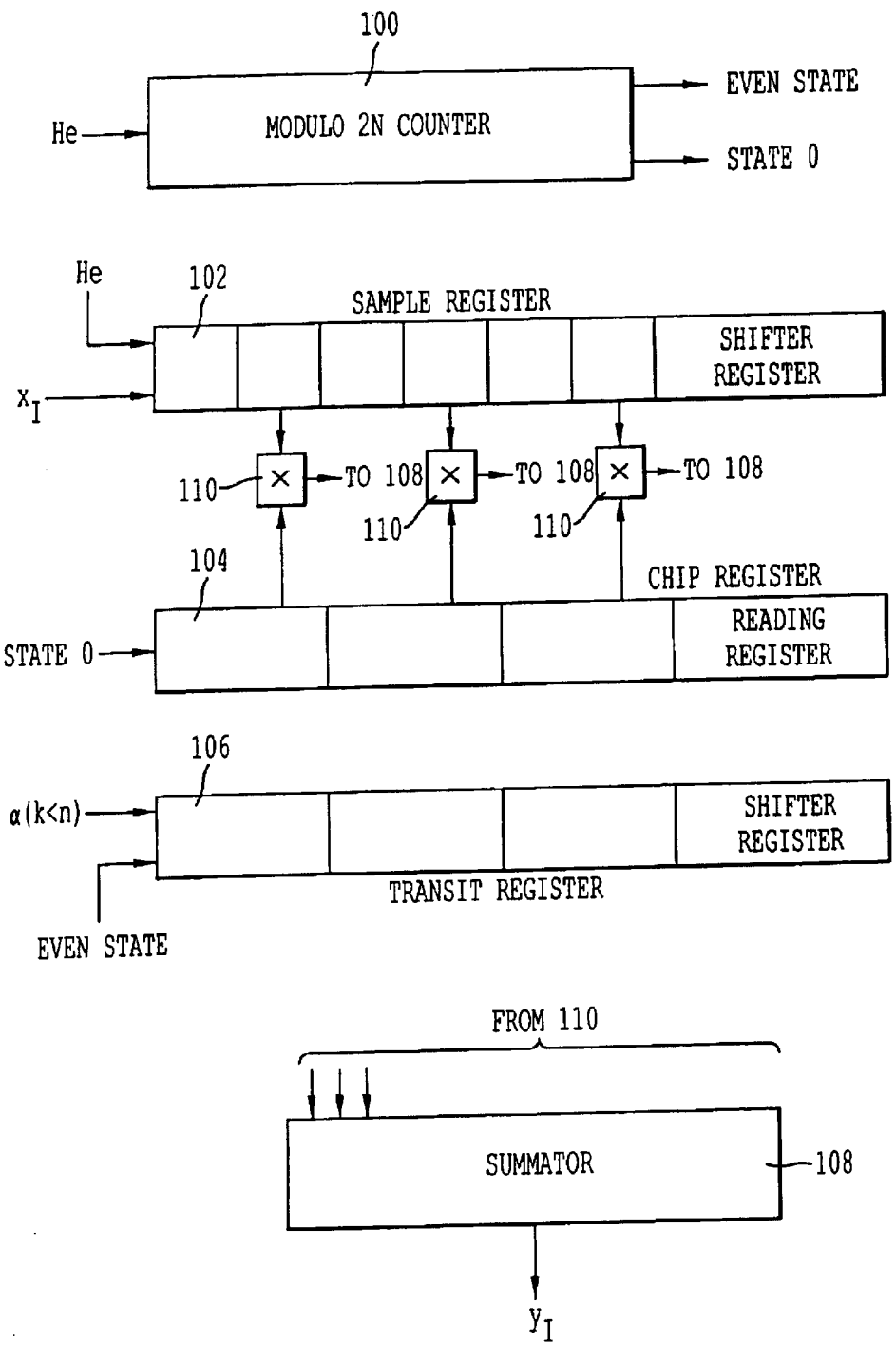
FIG. 6 illustrates a special despreading embodiment by a shift register method.
Figure 7:
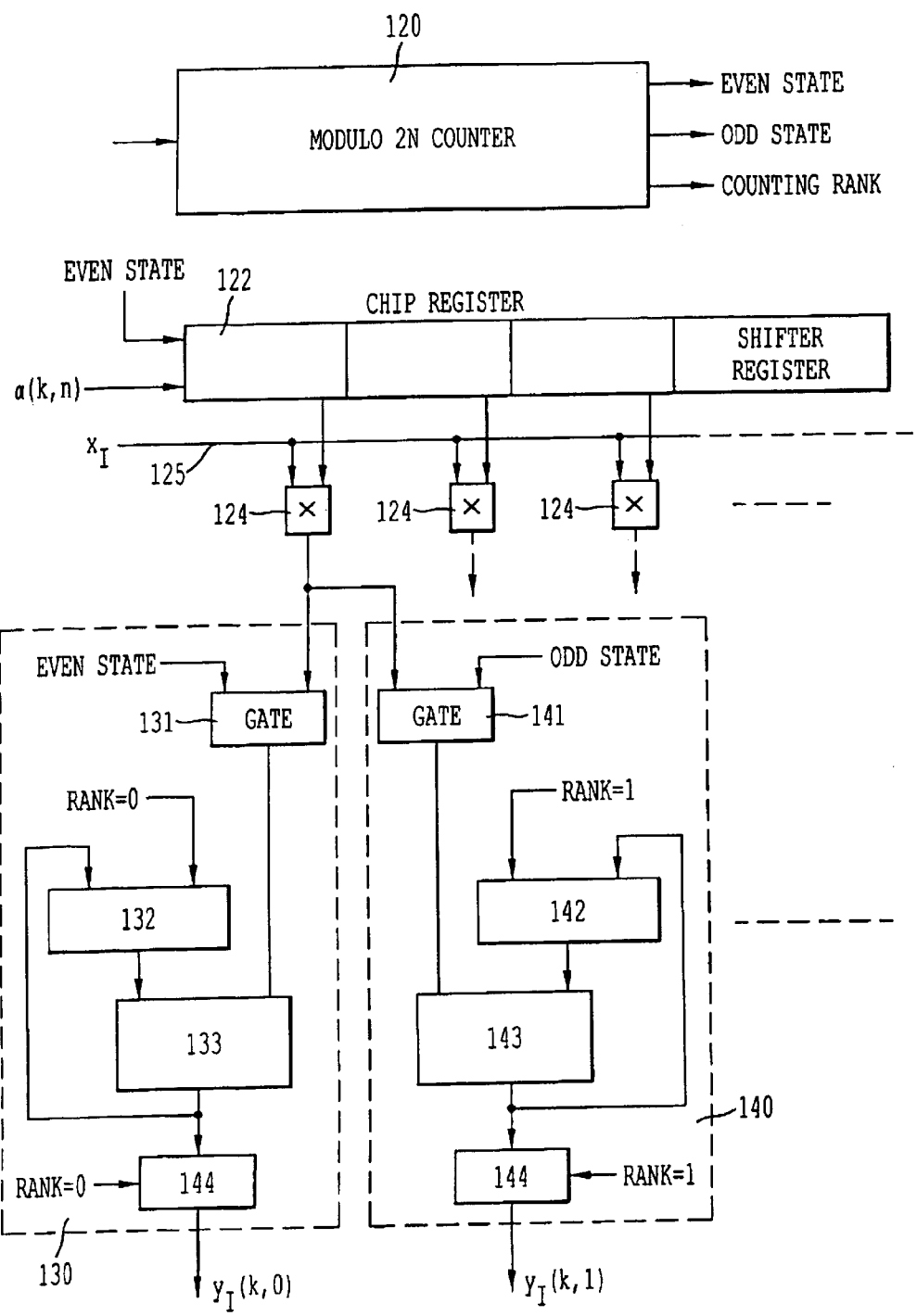
FIG. 7 illustrates another despreading embodiment by an accumulation method.

FIGS. 6 and 7 illustrate these despreading procedures, either by the shift register method (FIG. 6), or by the accumulation method (FIG. 7). FIGS. 6 and 7 still relate to CDMA transmission with modulation MDP2 for signals received sampled at a rate of two samples per chip. They show the usable despreading circuits (circuits 52I and 52Q for scanning, 53I and 53Q for tracking). Only the circuit of channel I is shown (that of channel Q being identical). The reference chip generator $\propto(k,n)$ is not shown. For reasons of simplicity, there is a limitation to the case where the correlation relates to a single symbol (i.e. on 2N samples, N being the spread factor) and where the window width is less than the duration of a symbol (Ne<2N). The control signals are obtained on the basis of the sample timing He by means of a modulo 2N counter. The even or odd state of the counter is reproduced at the chip timing, whilst a random particular rank of the counter is reproduced at the symbol timing.

Thus, FIG. 6 shows a modulo 2N counter 100 with one input receiving the sampling timing He and two outputs corresponding to an even state (chip timing) and a state 0 (symbol timing), a register of samples 102 with 2N positions receiving a shift signal which is He and as the input the current sample $x_I$, a chip register 104 receiving a reading signal, which is the output state 0 of the counter 100, a transit register 106 controlled by the "even state" signal and the chips $\propto(k,n)$ and the multipliers 110 multiplying the samples by the chips, the outputs of said multipliers being connected to a summator 108, whose output delivers the signal $y_I$.

The sequence of samples permanently passes into the sample register 102. The sequence of chips is introduced into the transit register 106 in accordance with conditions dependent on the use (scanning or tracking). It is transferred blockwise at each symbol period into the shift register 104. Correlation takes place every two positions of the sample register.

FIG. 7 shows how despreading can be obtained by accumulation of partial correlations of the current sample received $x_I$ and a sliding portion of the sequence of chips $\propto(k,n)$. The circuit shown comprises a modulo 2N counter 120 with one input receiving the sampling timing He and three outputs delivering an "even state", "odd state" and "counting rank" signal, a chip register 122 receiving as the shift signal the "even state" signal and as the input the chips ∝((k,n), multipliers 124 having two inputs, one connected to the output of one cell of the register 122 and the other to one line 125 receiving the current sample $x_f$, accumulation means 130, 140, etc. comprising a gate 131 (141) controlled by the "even state" (odd state) signal and by the output of the multiplier 124, an initialization circuit 132 (142) receiving the "rank=0" (rank=1) signal, an adder-accumulator 133 (143) connected to the gate 131 (141), the output of said adder being relooped on the initialization circuit 132 (142), a reading circuit 134 (144) controlled by the "rank 0" (rank 1) signal and delivering despread samples $y_f(k,0)$, (respectively $y_f(k,1)$.

What is claimed is:

1. Process for the timing synchronization of a digital signal, in which sampling takes place with a certain sampling period of an analog signal resulting from the transmission of a signal modulated with the aid of a shaping function, there is a matched filtering of the samples, said filtering being matched to the shaping function used for the modulation and leading to correlation samples, said process comprising:

the elementary power of each correlation sample is calculated, a sliding window NeTe of width Ne times the sampling period Te is defined and commencing with a certain rank, said sliding window scans a given range of sampling times, for each sliding window, a calculation takes place of the sum of the elementary powers of the correlation samples located in said sliding window for a symbol or a given number of symbols, the window for which the sum of the powers is at a maximum is determined, the synchronization is then defined by the position of the sliding window with the maximum power sum and by the rank of each correlation sample within said sliding window, wherein two operation types are performed and working takes place in two modes:

a) in the first type of operations, known as scanning operations, there is a successive examination of all possible positions of the sliding window and for each position a calculation takes place of the global power of the correlation samples contained in the sliding window, the sliding window for which a global power is highest from the start of the cycle up to the present position is identified and the value of said highest power is stored, b) in the second type of operations, called tracking operations, account is only taken of the correlation sample, whose rank falls within a tracking window and calculation takes place on the one hand of the global power of said samples and on the other of a signal making it possible to lock the center of said sliding window on a mean position of the elementary powers which it contains, c) in a first operating mode, known as an acquisition mode, on the one hand whenever appearance takes place in a sliding window of a global power higher than the last power stored since the start of the scanning cycle and up to the present position, to the tracking window is allocated the present position of the sliding window and a verification procedure is initiated, on the other hand when the scanning cycle is ended, there is a passage into a tracking mode, d) in a second operating mode, known as a tracking mode, on the one hand the transfer mechanism of the position of the sliding window to the tracking window is inhibited, on the other when the permanent verification fails there is a return to the acquisition mode, wherein a choice is made of a relative power threshold λ between 0 and 1, the product of said threshold by the highest stored power is calculated and it is verified that the global power obtained in the tracking window is statistically higher than the value of the product.

2. Process according to claim 1, wherein a first or initial verification takes place consisting of examining whether, among Na successive values of the global power, at least Nb among them exceed the product of the threshold by the highest power, the numbers Na and Nb being chosen of the order of a few units and, if this is the case, there is a passage to a second or permanent verification consisting of comparing the global power with a quantity $\mu$Po, where $\mu$ is a threshold slightly below 1 and where Po designates the mean power expected in the synchronized state, the comparison relating to a large number of successive values of the global power.

3. Process according to claim 2, wherein, in the acquisition mode, the appearance in said sliding window of a global power higher than the last stored power relaunches a new initial verification.

4. Process according to claim 1, wherein the global powers calculated in the sliding window and in the tracking window result from the sum of the powers obtained for several symbols.

5. Process according to claim 1, wherein, a significance is associated with each sample rank within the tracking window, said significance being a function of the position of said rank with respect to the center of the window, a determination takes place of the location of the mean position of the elementary powers of the weighted samples with respect to the center of the sliding window and there is a correction of the sampling times of the analog signal in order to lock the center of the window on said mean position.

6. Process according to claim 5, wherein the significances $c(i)$ are of form:

$$c(i)=i-(Ne-1)/2$$

where the quantity $(Ne-1)/2$ characterizes the center of the window.

7. Process according to claim 5, wherein the significances ($c(i)$) are taken equal to +1 in the upper half of the window and equal to −1 in the lower half of the window.

8. Process according to claim 1, wherein the sampling period of the analog signal is a fraction (Ts/M) of the symbol period.

9. Process according to claim 1, wherein the analog signal corresponds to a signal of the code distribution multiple access or CDMA type corresponding to spread sequences formed from numbers known as chips, to which is applied a shaping, wherein the matched filtering carried out on the analog signal comprises a first filtering matched to the shape of the chips and delivering first samples and a second filtering matched to the spread sequences and applied to the first samples, said second matched filtering delivering second samples on the basis of which are calculated the elementary and global powers respectively located in the sliding and tracking windows.

10. Process according to claim 9, wherein the sampling of the analog signal takes place at a frequency equal to k times the frequency of the chips forming the spread sequences, the second matched filtering then using, at a given time, one sample on k of the first samples.

11. Process according to claim 10, wherein k is equal to 2, the sampling of the analog signal consequently being carried out at a frequency double the frequency of the chips forming the spread sequences, the second matched filtering using, at a given time, one of every two samples.

12. Process according to claim 1, wherein the analog signal is a complex signal with a real component and an imaginary component and wherein each sample is also complex with a real component and an imaginary component, the matched filtering taking place on the real and imaginary components, the elementary and global powers being calculated by forming the sum of the powers of the real and imaginary components of the samples.

13. A process for synchronizing a digital signal, comprising:
    modulating a signal with a shaping function, thereby producing an analog signal;
    sampling the analog signal at a predetermined sampling period, thereby obtaining a plurality of samples;
    filtering the plurality of samples based on the shaping function, thereby obtaining a plurality of correlated samples, wherein the filtering comprises,
        calculating at least one elementary power for each of the plurality of correlated samples,
        defining a sliding window configured to scan a given range of sampling periods,
        calculating a sum of the at least one elementary power for the plurality of correlated samples located within the sliding window for a symbol,
        identifying a maximum sliding window having the largest sum of the at least one elementary power,
        defining a synchronization based on a position of the maximum sliding window and on a rank of each correlated sample present in the sliding window;
    performing at least one of a scanning and a first tracking,
        the scanning comprising,
            iteratively examining possible positions of the sliding window,
            calculating a global power of the correlated samples present in the sliding window at each possible position,
            identifying a position having the largest global power, and
            storing a value of the largest global power,
        the first tracking comprising,
            determining which of the plurality of correlated samples falls within a tracking window, thereby locating a tracked sample,
            calculating a global power of the tracked sample, and
            locating a signal enabling positioning of a center of the tracking window on a mean position of elementary powers contained in the tracking window,
    performing at least one of an acquiring and a second tracking,
        the acquiring comprising,
            allocating the tracking window to a position of the sliding window when the sliding window has a global power higher than the largest global power stored in the scanning, and
            verifying the tracking window, the second tracking starting when the scanning ends, and comprising,
                inhibiting transfer of the sliding window to the tracking window, and
                returning to the acquiring when the verifying fails.

14. The process according to claim 13, wherein the verifying comprises:
    examining Na successive values of the global power;
    determining if at least Nb of the Na successive values exceeds the product of a threshold and a highest power; and
    successively comparing the global power with a quantity $\mu Po$, where $\mu$ represents a threshold slightly less than 1 and where Po designates a mean power expected in a synchronized state.

15. The process according to claim 14, wherein the verifying is repeated when a global power higher than the largest global power is located.

16. The process according to claim 13, wherein the global powers calculated in the sliding window and the tracking window represent a sum of powers obtained for a plurality of symbols.

17. The process according to claim 13, further comprising associating a significance with each sample rank within the tracking window, wherein the significance is a function of a position of the rank relative to the center of the tracking window;
    determining a location of a mean position of the powers of the plurality of correlated samples relative to the center of the tracking window; and
    correcting sampling times of the analog signal to lock the center of the tracking window on the mean position.

18. The process according to claim 17, wherein the significance is represented by:

$$c(i)=i-(Ne-1)/2,$$

wherein $(Ne-1)/2$ identifies the center of the tracking window.

19. The process according to claim 18, wherein $c(i)=(1)$ in an upper half of the tracking window and $c(i)=(-1)$ in a lower half of the tracking window.

20. The process according to claim 16, wherein the predetermined sampling period is a fraction of the plurality of symbols.

21. The process according to claim 13, wherein the analog signal includes a signal for code distribution multiple access or CDMA type corresponding to at least one spread sequence formed from at least one chip.

22. The process according to claim 21, wherein the analog signal is sampled at a frequency equal to k times a frequency of the at least one chip forming the at least one spread sequence.

23. The process according to claim 22, wherein k=2.

24. The process according to claim 13, wherein the analog signal includes a complex signal with a real component and an imaginary component,
    wherein each of the plurality of samples includes a real component and an imaginary component,
    wherein each real component and imaginary component of each of the plurality of samples undergoes matched filtering, and
    wherein the at least one elementary power and the global power are calculated by summing powers of the real and imaginary components.

* * * * *

UNITED STATES PATENT AND TRADEMARK OFFICE
CERTIFICATE OF CORRECTION

PATENT NO. : 6,717,996 B1
DATED : April 6, 2004
INVENTOR(S) : Philippe Du Reau et al.

It is certified that error appears in the above-identified patent and that said Letters Patent is hereby corrected as shown below:

Column 5,
Line 46, replace "m=M.p+q" with -- m=M·p+q --

Column 8,
Line 34, replace "Ts=M.Te" with -- Ts=M·Te --
Line 50, replace "h*(iTe).r[(i+m).Te]" with -- h*(iTe)·r[(i+m)·Te] --

Column 9,
Line 16, replace "z(m)=$\sum_{i=i_1}^{i_2}$ h*(iTe).r[(i+m).Te]" with --z(m)=$\sum_{i=i_1}^{i_2}$ h*(iTe)·r[(i+m)·Te]--

Column 15,
Line 65, replace "$\alpha_I((n)$" with -- $\alpha_I(n)$ --

Signed and Sealed this

Twenty-first Day of September, 2004

JON W. DUDAS
*Director of the United States Patent and Trademark Office*

UNITED STATES PATENT AND TRADEMARK OFFICE
CERTIFICATE OF CORRECTION

PATENT NO.   : 6,717,996 B1
DATED        : April 6, 2004
INVENTOR(S)  : Philippe Du Reau et al.

It is certified that error appears in the above-identified patent and that said Letters Patent is hereby corrected as shown below:

Column 5,
Line 46, replace "m=M.p+q" with -- m=M·p+q --

Column 8,
Line 34, replace "Ts=M.Te" with -- Ts=M·Te --
Line 50, replace "h*(iTe).r[(i+m).Te]" with -- h*(iTe)·r[(i+m)·Te] --

Column 9,
Line 16, replace "$z(m)=\sum_{i=i_1}^{i_2} h_*(iTe).r[(i+m).Te]$" with $--z(m)=\sum_{i=i_1}^{i_2} h^*(iTe)\cdot r[(i+m)\cdot Te]--$ Column 15,
Line 65, replace "$\alpha_I((n)$" with -- $\alpha_I(n)$ --

Signed and Sealed this

Twenty-second Day of March, 2005

JON W. DUDAS
*Director of the United States Patent and Trademark Office*

UNITED STATES PATENT AND TRADEMARK OFFICE
CERTIFICATE OF CORRECTION

PATENT NO. : 6,717,996 B1
DATED : April 6, 2004
INVENTOR(S) : Philippe Du Reau et al.

It is certified that error appears in the above-identified patent and that said Letters Patent is hereby corrected as shown below:

Column 3,
Line 61, replace "r(t)=A.exp(j$\phi$).b(t-$\tau$)" with -- r(t)=A·exp(j$\varphi$)·b(t-$\tau$) --.
Lines 64 and 67, replace "$\phi$" with -- $\varphi$ --.

Column 4,
Line 20, replace "s($\tau$+nTs)=(A.exp(j$\phi$.a(n).Rh(0)" with
-- s($\tau$+nTs)=(A·exp(j$\phi$)·a(n)·Rh(0) --.
Line 25, replace "s($\theta$+$\tau$+nTs)$\cong$(A.exp(j$\phi$).a(n).Rh($\theta$)" with
-- s($\theta$+$\tau$+nTs)$\cong$(A·exp(j$\varphi$)·a(n)·Rh($\theta$) --.
Line 28, replace "|s($\theta$+$\tau$+nTs|$^2 \cong$A$^2$.|a(n)|$^2$.|Rh($\theta$)|$^2$" with
-- |s($\theta$+$\tau$+nTs)|$^2 \cong$A$^2$·|a(n)|$^2$·|Rh($\theta$)|$^2$ --.

Column 5,
Line 46, replace "m=M.p+q" with -- m=M·p+q --.

Column 8,
Line 34, replace "Ts=M.Te" with -- Ts=M·Te --.
Line 50, replace "h*(iTe).r[(i+m).Te]" with -- h*(iTe)·r[(i+m)·Te] --.

Column 9,
Line 16, replace "$z(m)=\sum_{i=i_1}^{i_2} h*(iTe).r[(i+m).Te]$" with -- $z(m)=\sum_{i=i_1}^{i_2} h*(iTe)·r[(i+m)·Te]$ --

UNITED STATES PATENT AND TRADEMARK OFFICE
CERTIFICATE OF CORRECTION

PATENT NO. : 6,717,996 B1
DATED : April 6, 2004
INVENTOR(S) : Philippe Du Reau et al.

It is certified that error appears in the above-identified patent and that said Letters Patent is hereby corrected as shown below:

Column 15,
Line 65, replace "$\alpha_I((n)$" with -- $\alpha_I(n)$ --.

This certificate supersedes Certificate of Correction issued September 21, 2004 and March 22, 2005.

Signed and Sealed this

Twenty-seventh Day of September, 2005

JON W. DUDAS
*Director of the United States Patent and Trademark Office*